Aug. 16, 1966   W. R. AMSTUTZ   3,266,844
TRUSS CUSHION FRAME

Filed May 4, 1964   10 Sheets-Sheet 1

INVENTOR
Walter R. Amstutz

BY Stevens, Davis, Miller & Mosher
ATTORNEYS

Aug. 16, 1966  W. R. AMSTUTZ  3,266,844
TRUSS CUSHION FRAME
Filed May 4, 1964  10 Sheets-Sheet 2
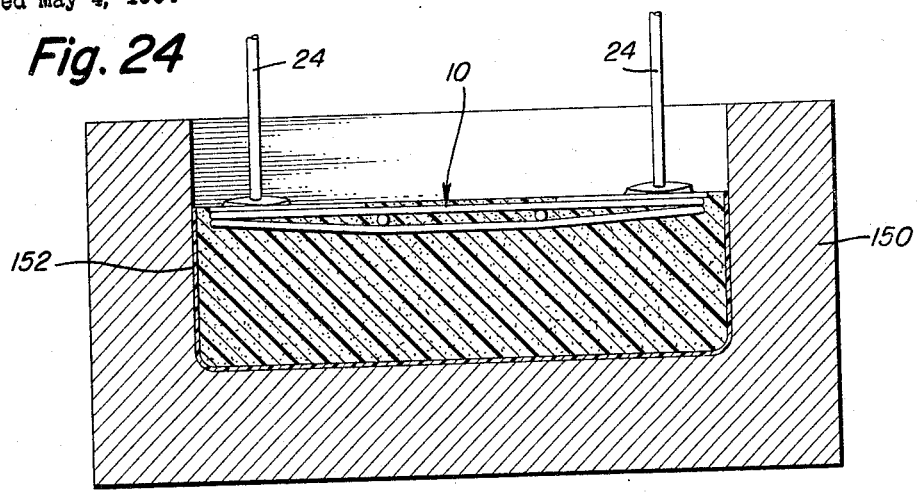
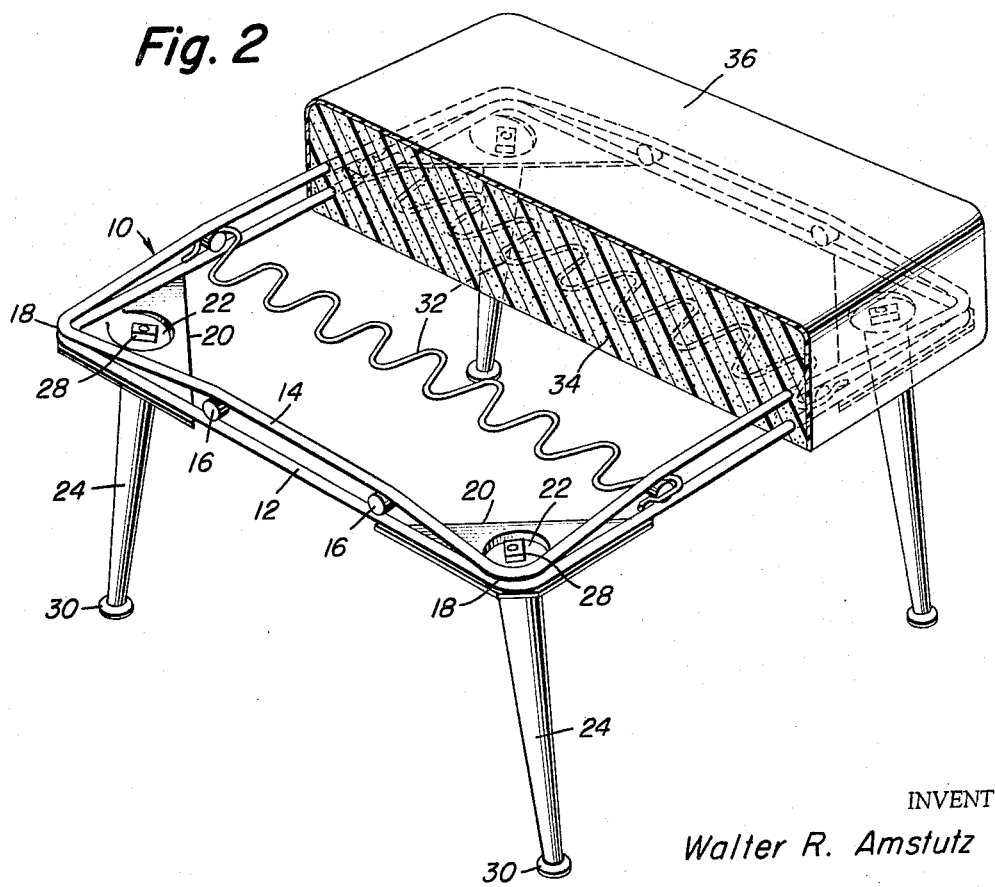
INVENTOR
Walter R. Amstutz
BY Stevens, Davis, Miller & Mosher
ATTORNEYS

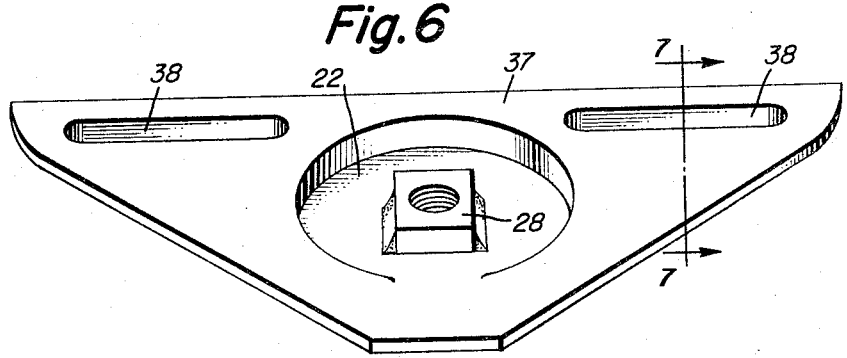
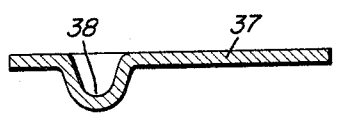
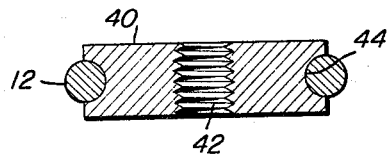
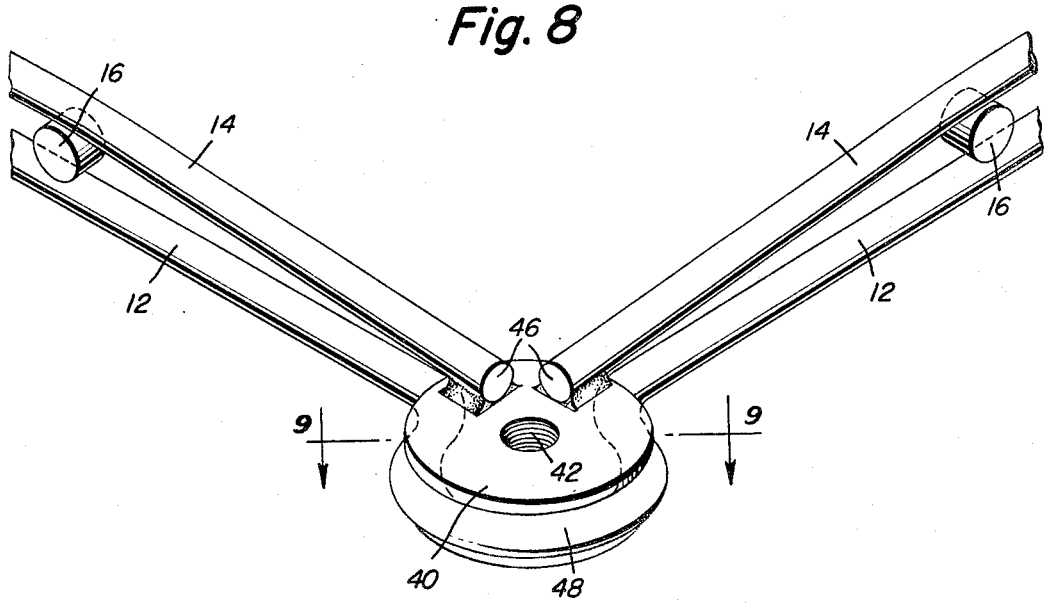

INVENTOR
Walter R. Amstutz

BY Stevens, Davis, Miller & Mosher
ATTORNEYS

Aug. 16, 1966 W. R. AMSTUTZ 3,266,844
TRUSS CUSHION FRAME
Filed May 4, 1964 10 Sheets-Sheet 7
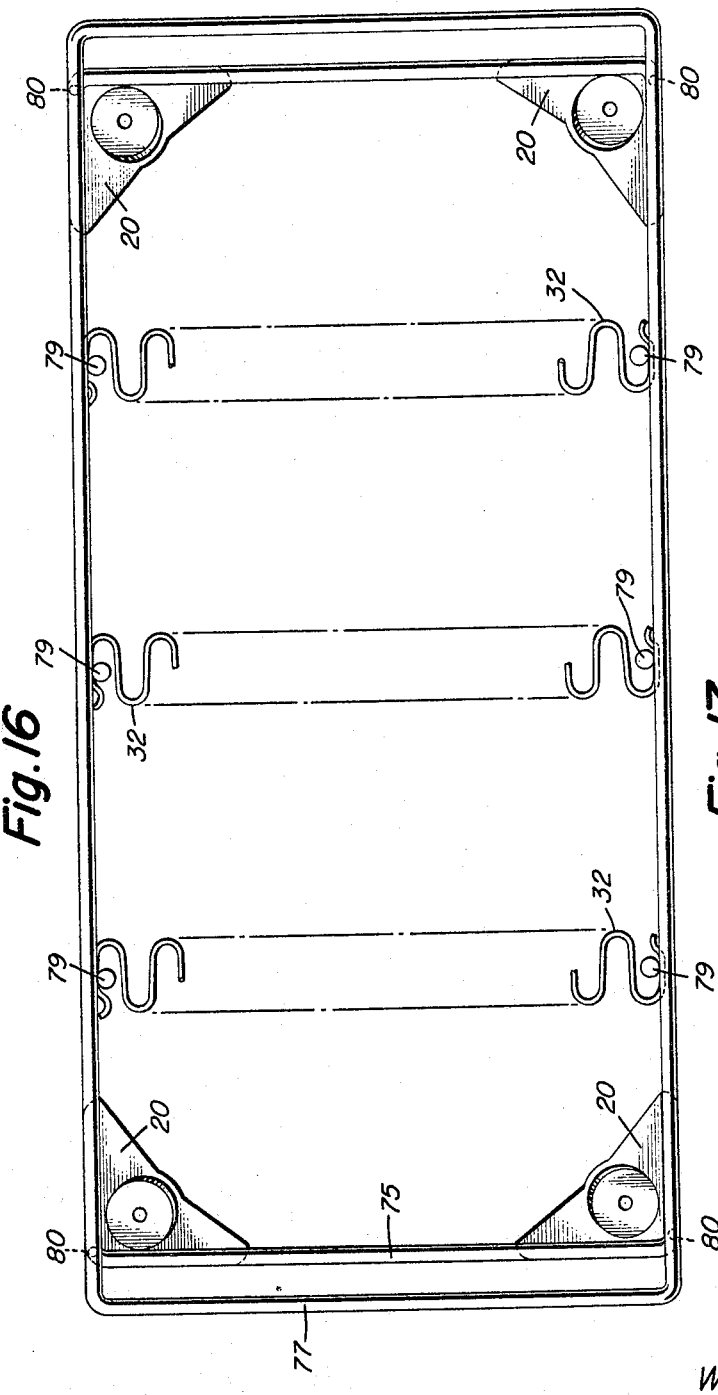
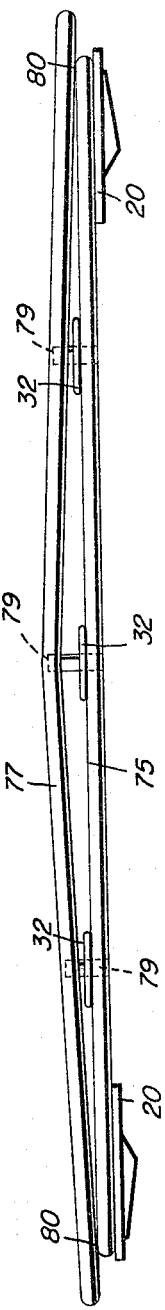
INVENTOR
Walter R. Amstutz
BY Stevens, Davis, Miller & Mosher
ATTORNEYS

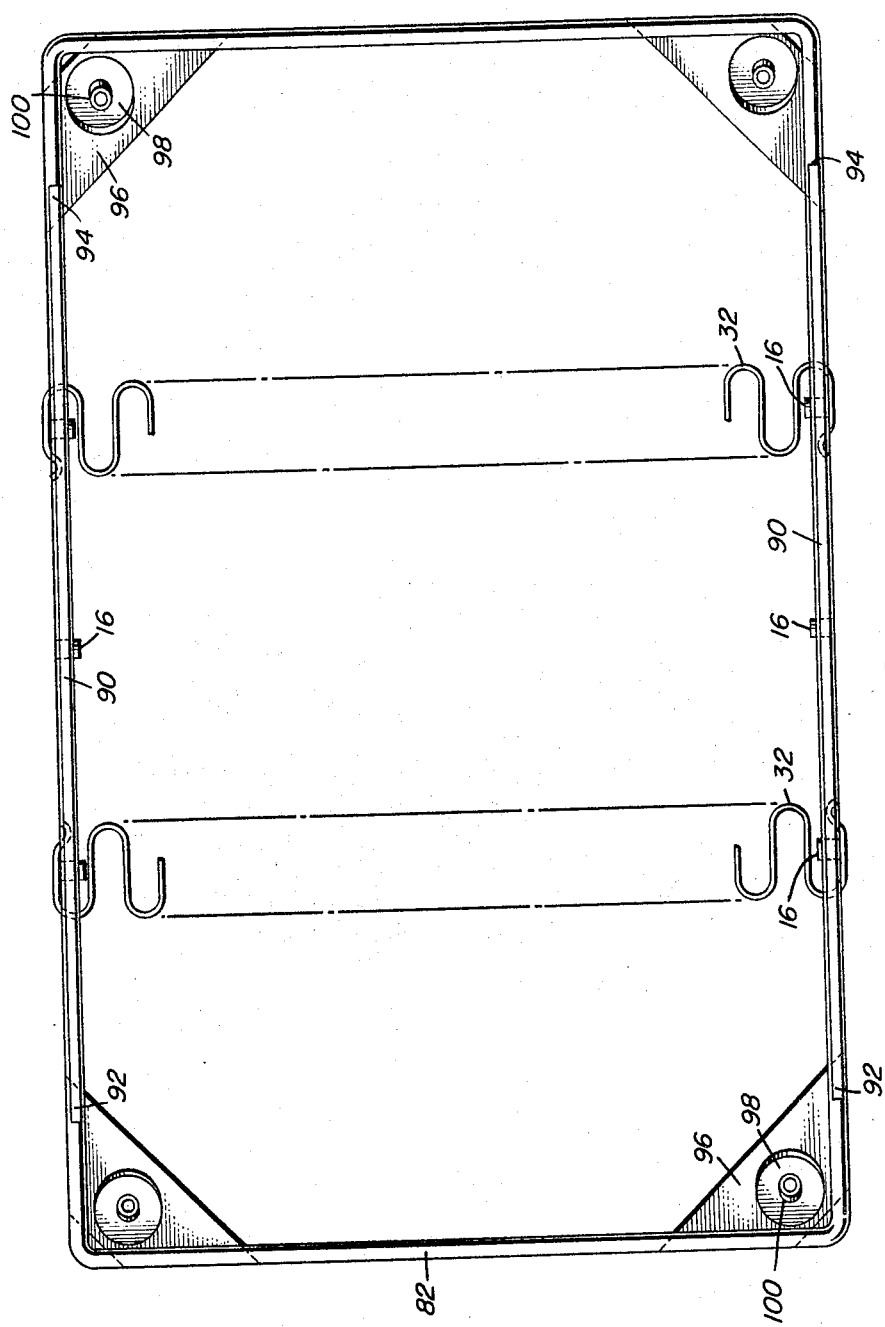
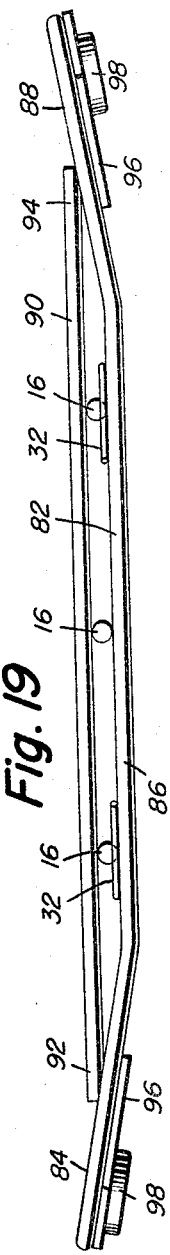

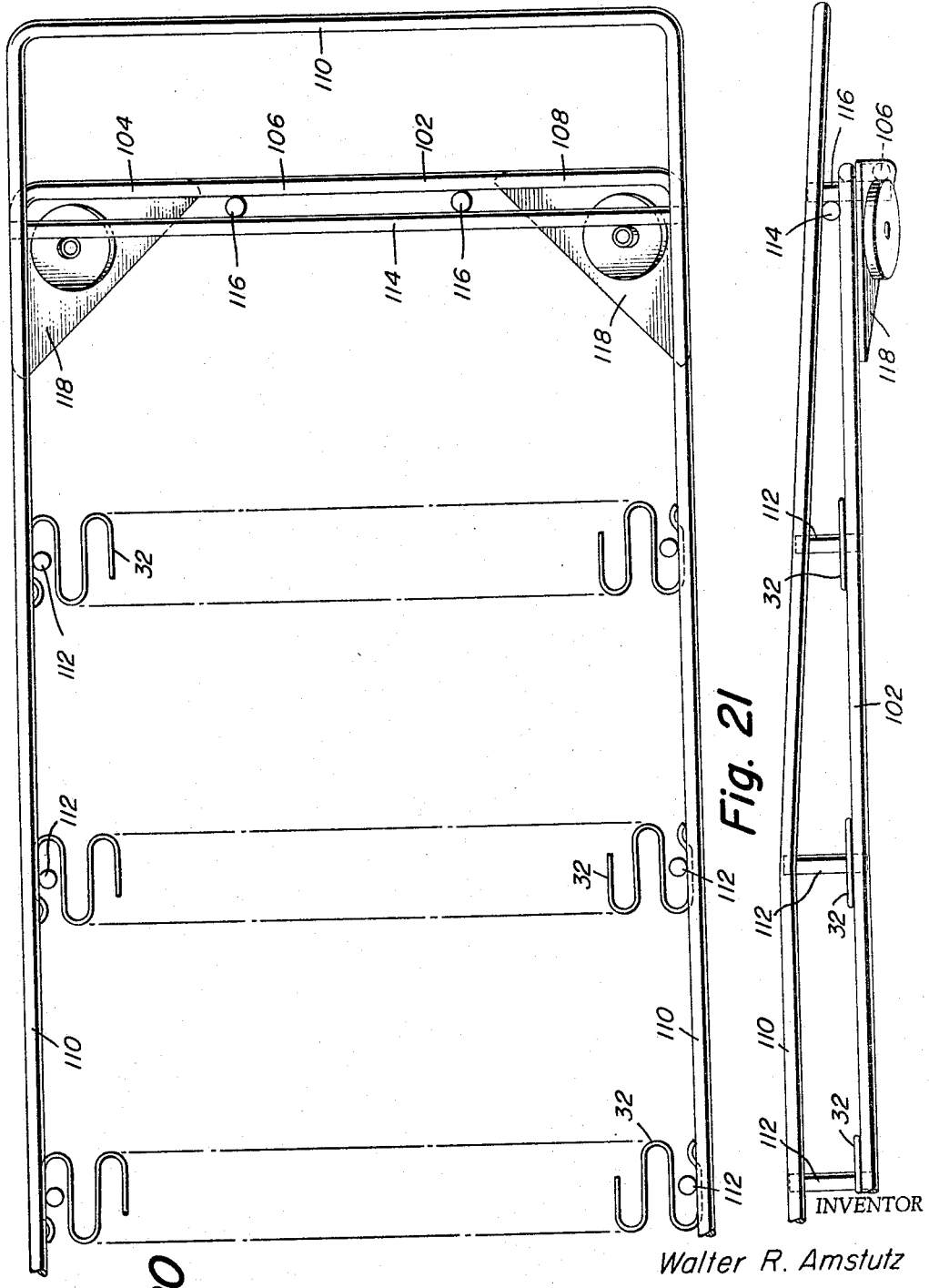

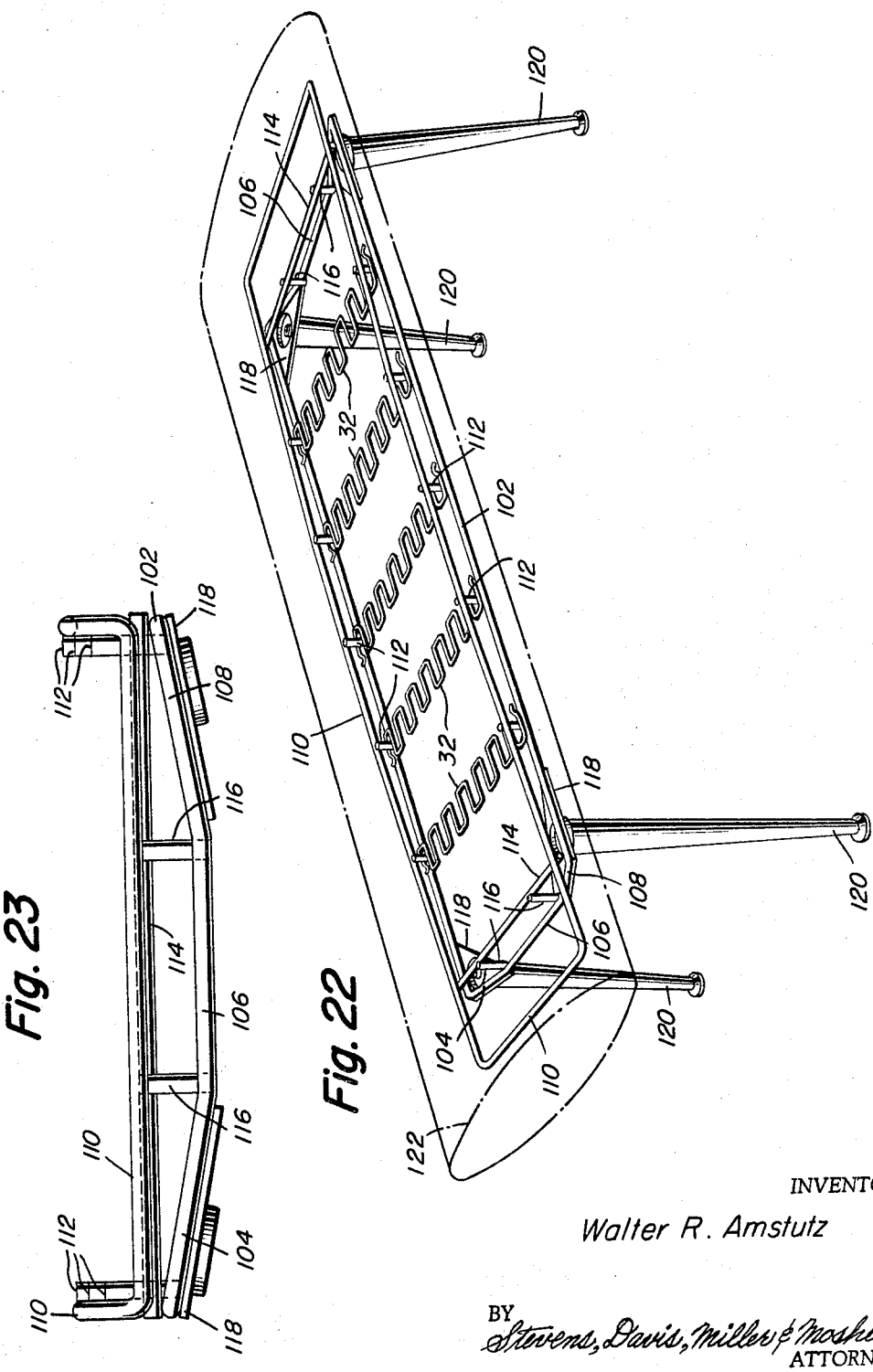

United States Patent Office 3,266,844
Patented August 16, 1966

3,266,844
TRUSS CUSHION FRAME
Walter R. Amstutz, New York, N.Y., assignor to B. T. Crump Company, Inc., Richmond, Va., a corporation of Virginia
Filed May 4, 1964, Ser. No. 364,685
8 Claims. (Cl. 297—452)

This invention relates to frames for cushion members or the like and more particularly truss frames for cushions, said frames being extremely strong in construction and adapted to withstand great forces.

This invention also relates to the method of making a cushion or hassock which incorporates the truss frame.

As contemporary designs of furniture, such as sofas, benches, chairs and hassocks, require slimmer and thinner cushions, there has been a growing need for such furniture elements to have more shallow frameworks which can withstand greater forces than were necessary in the past.

It is therefore an object of the present invention to provide a framework for a cushion or hammock or the like which is shallow but which is exceptionally strong and can bear great external forces.

Another object of the invention is to provide an exceptionally strong framework so that the cushion material need not bear the supporting forces and said material need only to provide comfort, flexibility, and beauty.

It is a further object of the present invention to provide for a cushion frame which utilizes the truss principle, which is simple in construction, and which can bear extremely great external forces.

It is a further object of the present invention to provide a cushion frame structure utilizing the truss principle and which cooperates with leg members so that the truss principle can be efficiently employed.

It is a still further object of the present invention to provide a cushion frame utilizing the truss principle which cooperates with corner members which are adapted to cooperate with respective leg members.

It is a further object of the present invention to set forth various cushion frames utilizing the truss principle so that a number of desired cushion shapes can be made, each having a strong, lightweight and sturdy frame.

It is a further object of the present invention to set forth a method of making a cushion having a truss framework.

Other and further objects of the present invention will become apparent with the following description when taken in view of the appended drawings in which:

FIG. 2 is a perspective view of one illustration of the truss frame as used in an example of a hassock arrangement;

FIG. 6 is a perspective view of a modification of the corner plate as used in the combination;

FIG. 7 is a sectional view taken along line 7—7 of FIG. 6;

FIG. 8 is a perspective view of another modification of the corner connection for the truss framework;

FIG. 9 is a sectional view taken along line 9—9 of FIG. 8;

FIG. 16 is a top plan view of a truss frame which is adapted to be used in rectangular cushions;

FIG. 17 is a front elevation of the frame in FIG. 16;

FIG. 18 is a plan view of a modification of a truss frame that can be used in a rectangular cushion;

FIG. 19 is a front elevation of the frame in FIG. 18;

FIG. 20 is a top elevation of still another modification of the truss frame that can be used in a rectangular cushion;

FIG. 21 is a front elevation of the frame shown in FIG. 20;

FIG. 22 is a perspective view of another modification of the truss frame that can be used in a rectangular cushion;

FIG. 23 is a side elevation of the frame found in FIG. 22; and

FIG. 24 illustrates the method of manufacture of a cushion utilizing the truss frame.

Figure 1A:
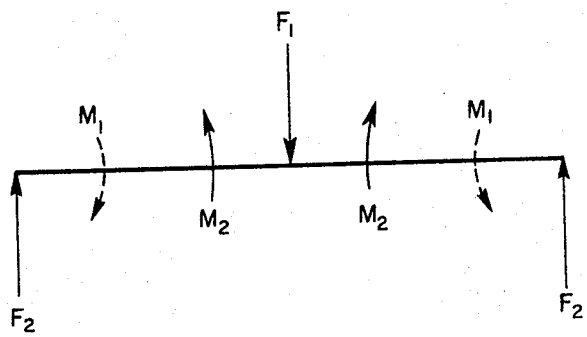
FIG. 1a is an illustration of the prior art.

Referring now to the figures in detail, there is shown in FIG. 1a a force diagram as found in one side of a conventional frame. It can be seen from this diagram that a downward force $F_1$ on the frame must be opposed by a pair of forces $F_2$, but because of the fulcrum or lever action, the moments $M_1$ are developed in the supporting frame. These moments $M_1$ must be counteracted by moments $M_2$ and the frame must be so designed to have sufficient bending resistance to establish moments $M_2$. Consequently, I-beam, flange or tubular members were previously used so that a sufficient resistance to bending forces could be supplied and adequate support for loads $F_1$ could be rendered. However, the practical and economical requirements of the art are such that extremely great loads of $F_1$ cannot be sustained by the conventional framework.

Figure 1B:
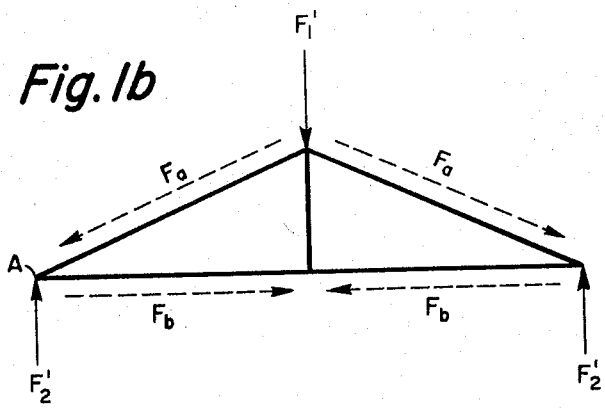
FIGS. 1b and 1c illustrate the basic principles involved in the truss-type support.
Figure 1C:
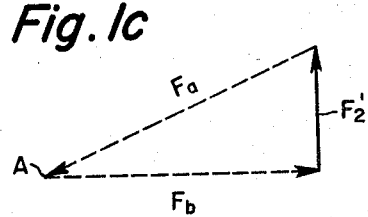
Figure 3:
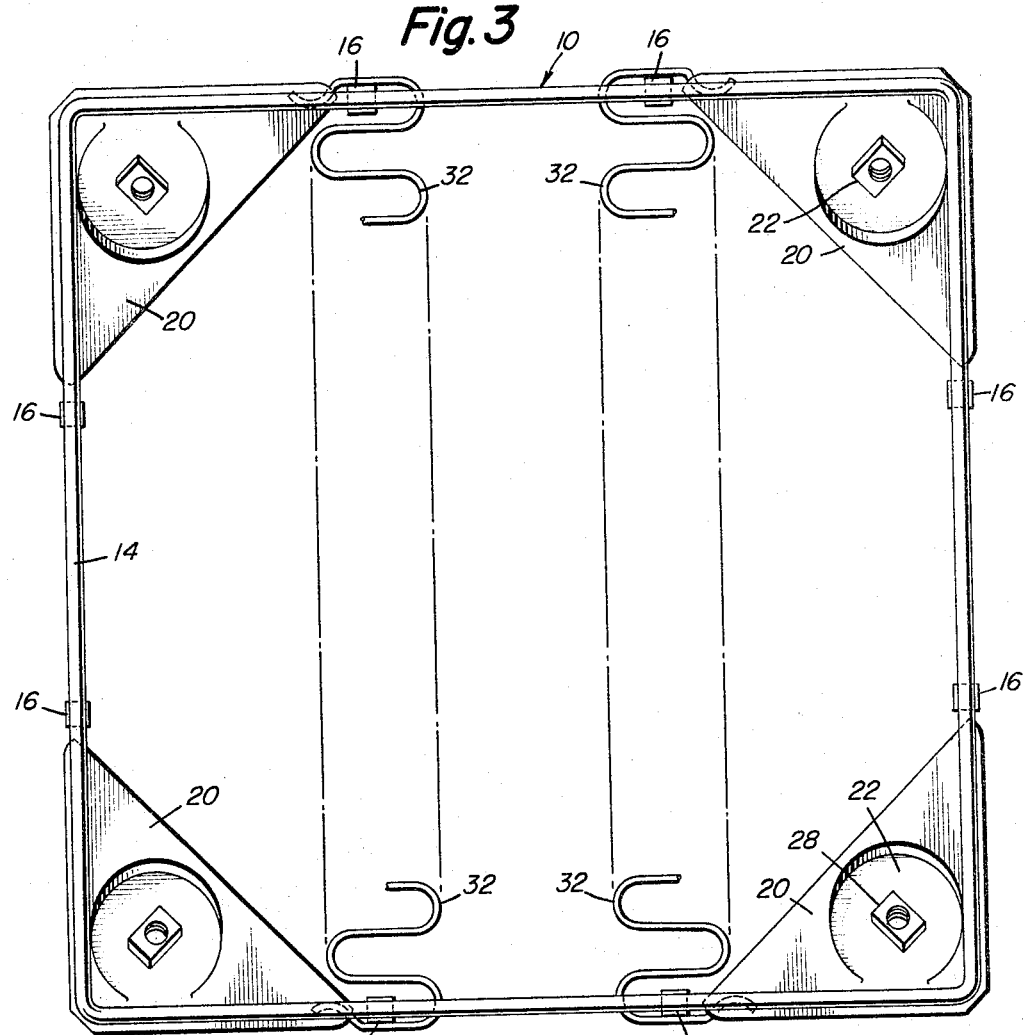
FIG. 3 is a top plan view of the frame as shown in FIG. 2.
Figure 4:
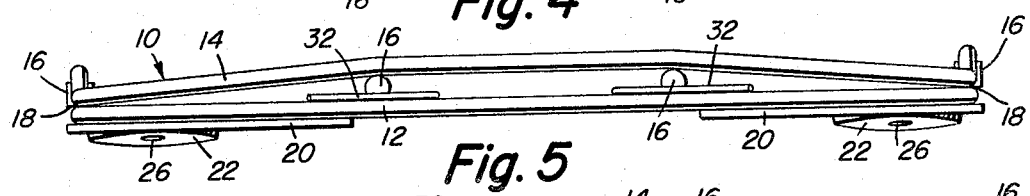
FIG. 4 is a front elevation of the truss frame as shown in FIG. 3.
Figure 5:
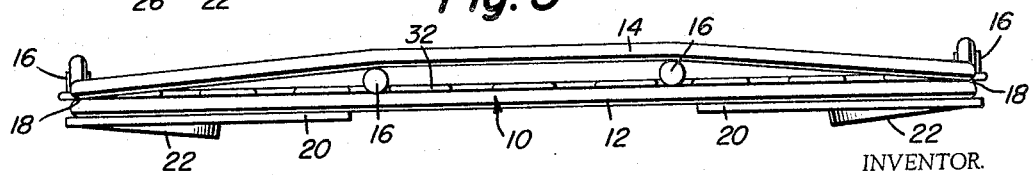
FIG. 5 is a side elevation of the truss frame as shown in FIG. 3.

Referring now to FIGS. 1b and 1c, there is illustrated the general and basic truss concept for a single-strut truss. An ideal truss is a framework consisting of straight bars or rod members connected at their ends by some rigid, frictionless means. The external forces are applied at these points and the mechanical design is such that the internal forces or stresses in said rods, bars, or wires are axial, either tension or compression, and no bending moments are imparted to said rods, bars, or wires. Secondary stresses are defined as additional stresses, generally flexural or bending, and these stresses are brought about by all the factors that make the actual truss different from the ideal truss. However, for the purpose of this description, the truss will be considered ideal. Therefore, as indicated in FIG. 1b, the downward force $F_1'$ is supported by the pair of forces $F_2'$; however, no bending or moment forces are established in the connecting wires because $F_a$ and $F_b$ are only compression and tension forces respectively. There is illustrated in FIG. 1c the vector force diagram for one side of the truss. As shown by this diagram, the vector forces at a connecting point such as A form a closed loop and have a vector sum of zero (0), which is the condition necessary for equilibrium and stability.

Therefore, it can be seen that extremely great forces $F_1'$ can be supported by the truss framework without the need of flange members or tubular members to oppose moment forces established in a frame network. Since the frame only experiences compression and tension, the truss framework can comprise a plurality of small, thin wires having, for example, a diameter of 0.365 inch, so that great weights and forces $F_1'$ can be supported. The wires are preferably made from cold-drawn steel, which is known to have a very high tensile strength and a very high yield strength.

The truss framework for a cushion unit will be described in the example of a hassock taking various shapes and forms. Referring now to FIGS. 2–5, there is illustrated a double-strut truss frame generally indicated as 10 having a lower wire 12 which defines a closed path substantially rectangular in shape and an upper wire 14 which follows and overlies lower wire 12. Buttons 16 are welded to the wires at selected locations to retain wires 12 and 14 in proper space relationship. The respective corners of wire 14 and wire 12 are rigidly secured together at 18 by any suitable means such as welding. Corner or angle plates 20 are welded or otherwise secured at the respective corners of wire 12 and comprise a countersink 22 which can be formed by punching or stamping; said countersink is disposed at a slight angle with respect to the plane of the angle plate 20.

In substantially the center of the countersink area there is provided a hole 26 which is adapted to receive a threaded member of each of the supporting legs 24. Said hole 26 can be threaded or a nut means 28 can be welded to the countersink 22, said nut having an axis which coincides with the axis of hole 26. Legs 24 are self leveling by having a swivel cap 30 mounted at the ends thereof.

In assembling the frame, the center buttons are welded first. Then the wires are heated to cause axial expansion. Next the wires are welded at the corners and the angle plates mounted thereto. When the wires cool, both the top and bottom wire will be in tension and are adapted to withstand greater loads.

There has been described so far the main supporting frame structure for an ottoman or the like which can support extremely great forces and weights. Extending across the area defined by the closed loop of wires 12 and 14 there is mounted spring means 32 having respective ends mounted to buttons 16. Spring members 32 are substantially uniplanar and have a series of undulations lying in their respective plane.

Any suitable foam-like material, such as urethane molded foam, can be molded about the framework in any desired shape. Said foam material 34 can be covered by any suitable covering such as expanded vinyl covering 36. It can be seen from FIG. 2 that the angular relationship between the countersink 22 and the plane of the corner member 20 provides for the outward disposition of supporting legs 24 for affording maximum strength to the ottoman.

Thus, there has been described an extremely strong, rigid, lightweight, and attractive cushion arrangement having a truss frame which is easily and economically assembled and of great mechanical advantage. It is to be understood that the number of buttons 16 and the number of spring means 32 and other obvious modifications can be made to the disclosed framework without departing from the spirit of the present invention.

Referring now to FIGS. 6 and 7, there is shown a modified angle plate 37 having elongated depression areas 38 which add strength and rigidity to the corner plate 36. With this added feature, even greater weights can be supported by the cushion unit having the truss frame and respective corner plates.

Referring to FIGS. 8 and 9, there is shown a modification of the corner connecting means which comprise a button member 40 having a centrally located threaded portion 42. Button 40 is substantially cylindrical in configuration and comprises a groove 44 located in a plane substantially perpendicular to the axis of said cylindrical configuration. The upper rods or wires 14 have terminating ends 46 which are welded to the upper surface of button 40. The lower wire 12 is continuous and defines an enlarged corner with a substantially circular path 48.

This particular arrangement affords rapid assembly because button 40 can be snapped into position as shown in FIG. 8 with the corner 48 of wire 12 contacting groove 44 so that said button is rigidly secured therein. The next steps of assembly will then be the same as described above. The retention of button 40 in the corner 48 of wire 12 can be assured by spot welding said button 40 at at least one location to corner 48.

Figure 12:
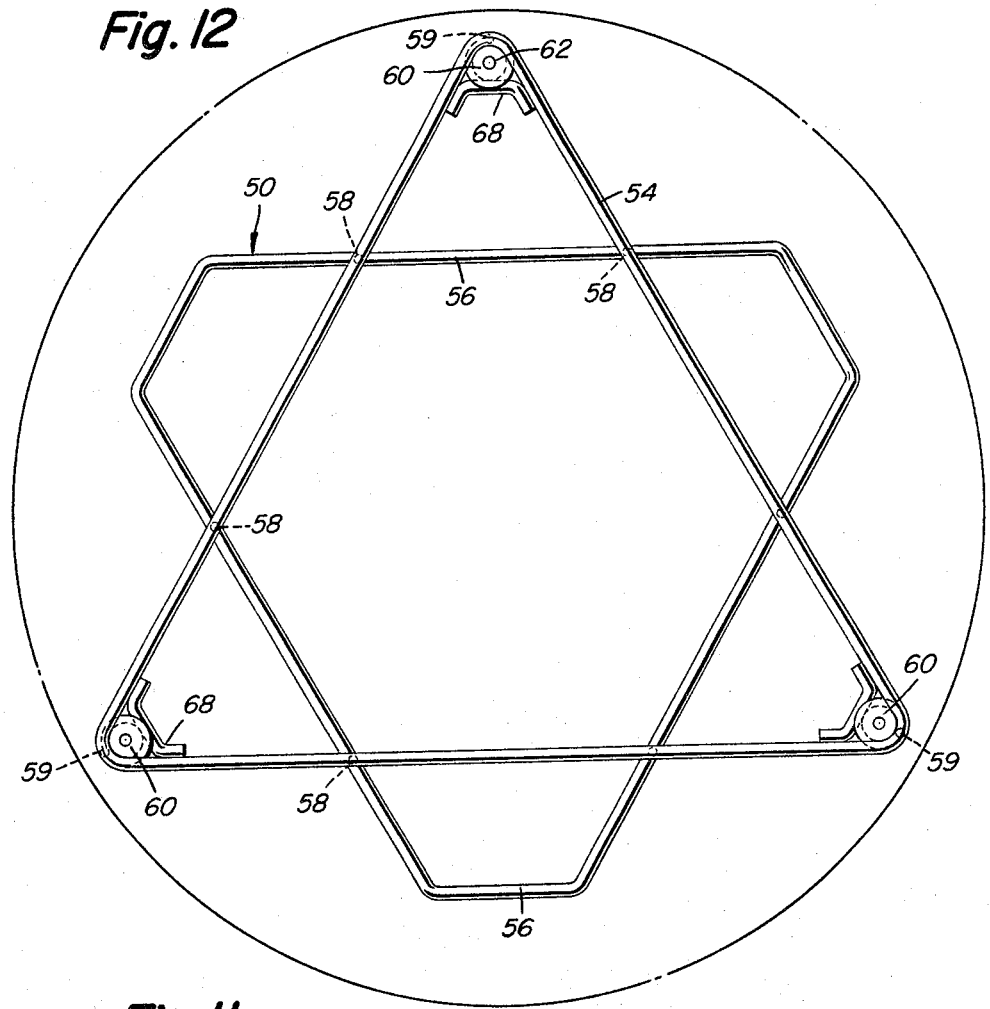
FIGS. 11 and 12 are front elevation and top plan view, respectively, of a frame utilizing the truss principle which is adapted to be used in round cushions.
Figure 11:

The truss construction can be adapted to take on various shapes so that various shapes and designs can be afforded for the respective cushion unit. For example, FIGS. 11 and 12 show one arrangement for a framework of a circular cushion. A truss frame generally indicated by 50 is generally star shaped and comprises a lower wire 52 and an upper wire 54 which form a closed path, in this case an equilateral triangle. Instead of having buttons to retain the spacing between wires 52 and 54, there is provided another wire 56 defining a closed path which is substantially triangular and which is disposed between said truss wires 52 and 54. The triangle formed by wire 56 is rotated 60° with respect to the triangle formed by wires 52 and 54 so that the vertices of triangle 56 extend between the midpoints of the sides of said triangle 52–54, as shown in FIG. 12. The truss is therefore formed by forcing the vertices of triangle 54 down into contact with 52 over the interposing sides of triangle 56 and welding the vertices of triangles 52–54 together at points 59. Wire 56 is preferably spot welded to wires 52 and 54 at the contacting positions such as 58. A substantially circular mold can be used to encapsulate the urethane foam material about the frame, and it can be seen from FIG. 12 that forces experienced near the periphery of the cushion will be adequately supported by the frame structure. Consequently, this particular frame will afford support for increased loads on a circular cushion.

Figure 10:
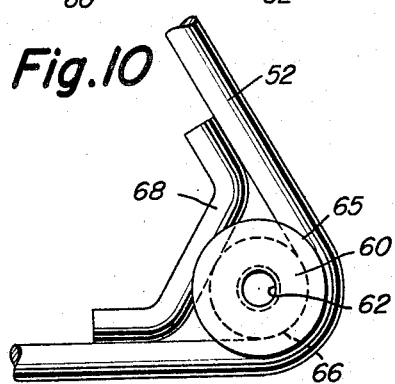
FIG. 10 is another modification of the corner connection that can be used in the combination.
Figure 13:
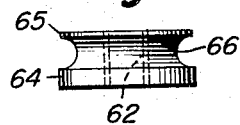
FIG. 13 is a front elevation view of the corner member used in FIG. 10.

Button 60 having an axially internal threaded portion 62 is provided with a thick lower lip 64 and a relatively thin upper lip 65. Said button has a groove 66 which is adapted to fit securely and snugly into the corner of wire 52 as shown in FIG. 10 and be retained therein by an angle wire 68 which has ends respectively welded to the wire 52 and a center member which also fits in groove 66 of button 60. Button 60 can also be welded to wire 52 to avoid the possibility of its being dislodged. If desired, the truss frame shown in FIG. 12 can further comprise spring members 32 shown in FIG. 2.

Figure 14:
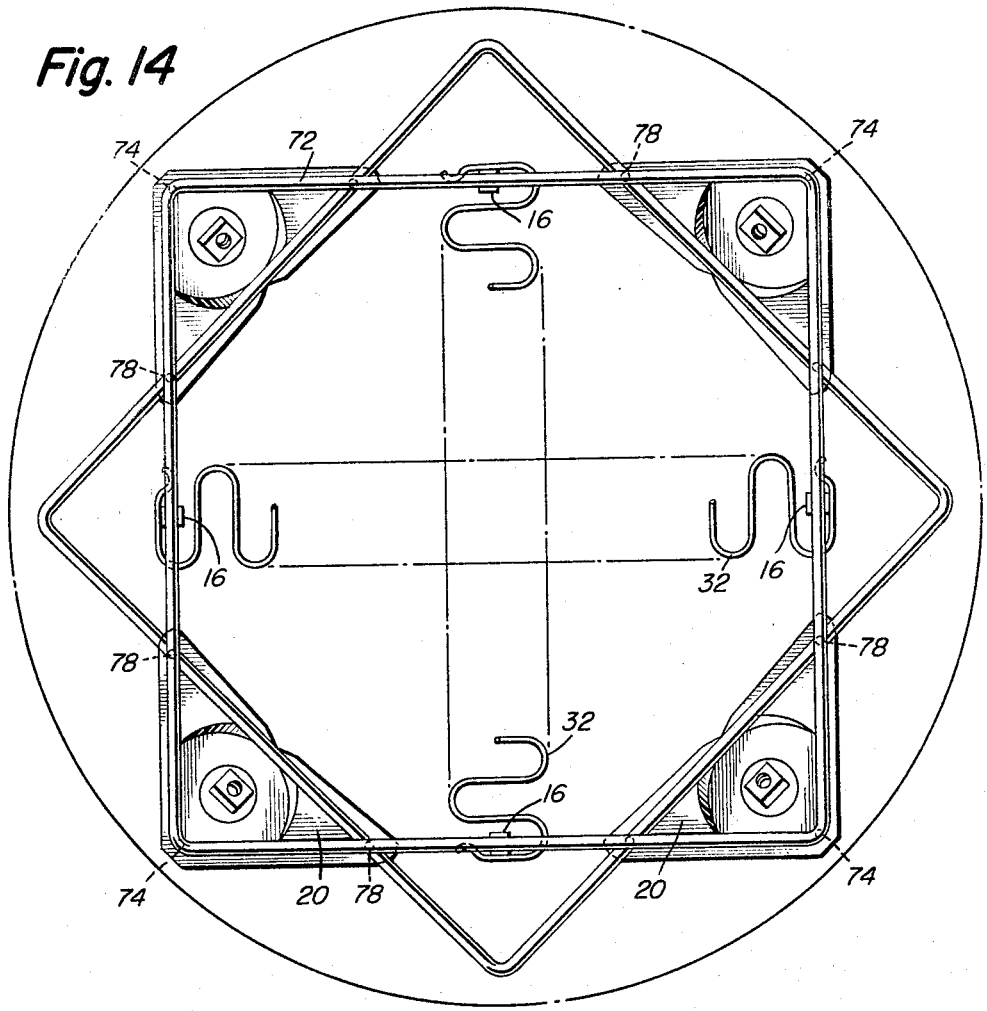
FIG. 14 is a top plan view of another truss frame which is adapted to be used in a round cushion.
Figure 15:
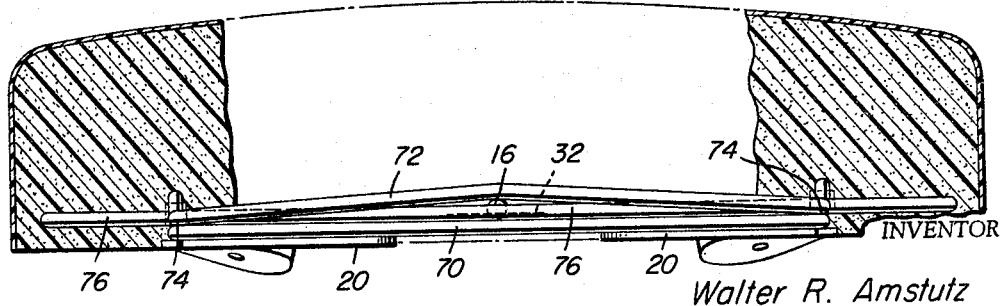
FIG. 15 is a front elevation and partial sectional view of the combination of FIG. 14.

Referring now to FIGS. 14 and 15, there is shown another arrangement for a framework which is adapted to be used in a circular cushion. Again, this truss framework comprises a lower wire 70 and an upper wire 72 retained in spaced relationship by buttons 16 and defining closed paths, in this case square paths, having the respective corners welded together such as at 74. Another wire 76 defines a closed path having the same number of sides as the closed path defined by wires 72 and 70 and is disposed between said wires and spot welded at contacting positions 78. Spring means 32 are mounted to buttons 16 and extend across the area defined by the closed paths. Legs supporting corner plates 20 are rigidly secured to the underside of wire 70 and are adapted to receive and rigidly secure a supporting member thereto. Again, a circular mold can be used to encapsulate the foam material vinyl covering about the truss frame. The operation of this frame is substantially the same as that described for the operation of FIG. 12 above.

Referring now to FIGS. 16 and 17, there is shown a truss frame adapted to be utilized in a rectangular cushion unit, said frame having a lower wire 75 which defines a closed loop in rectangular form and an upper wire 77 which also defines a closed rectangular loop. The longitudinal sides of wire 75 are somewhat shorter than the longitudinal sides of wire 77, so that a greater supporting force can be applied at a predetermined distance beyond the leg members. Wires 75 and 77 are welded at their points of contact such as 80. Uprights 79 are also welded to wires 75 and 77 and retain said wires in the proper spaced relationships. Spring members 32 are mounted laterally across the area defined by the closed loops and have respective ends secured around uprights 79.

The truss frame having a deeper vertical dimension enables greater supporting strength for elongated cushion units. Such units can be used in benches, sofas, and the like.

It will be noted that in the embodiments described above, the truss support was of the upstanding truss type. However, there is illustrated in FIGS. 18 and 19 a depending truss frame adapted to be used in a rectangular cushion unit. Wire 82 defines a closed rectangular loop, said loop being disposed in three intersecting planes defined by sections 84, 86 and 88. Upper wires 90 are cut to the suitable length and have respective ends 92 and 94 welded at the points of contact with wire 82. Buttons 16 are welded to the respective wires 90 and 82 and retain said wires in spaced relationship. Corner plates 96 have a countersink area 98 with a threaded upstanding nipple 100 disposed in substantially the center thereof. Said corner plate 96 is welded or otherwise secured to the underside of wires 82 at the corners thereof and is adapted to receive and secure a suitable supporting member. Spring members 32 are mounted across the area defined by the closed loop and wire 82. This particular frame disclosed in FIGS. 18 and 19 is suitable for use in a cushion unit, said cushion having an arcuate or concave top. Thus, the frame allows for new design features without sacrificing weight or strength.

FIGS. 20–23 illustrate another type of truss frame which allows for utility in a rectangular cushion unit. Lower wire 102 defines a rectangular closed loop, said rectangle lying in three intersecting planes defined by sections 104, 106 and 108, better seen in FIGS. 22 and 23. The upper wire 110 also defines a substantially rectangular closed loop which overlies the loop defined by 102. The longitudinal axis of the upper rectangle is substantially greater than the longitudinal axis of the lower rectangle, and the ends thereof overlap an equal distance on either side of the ends of the lower rectangle. Vertical upright members or uprights 112 retain the respective wires in proper spaced relationship and are welded to said respective wires. A pair of transverse rods or wires 114 are mounted to the longitudinal sides of the underwire 102 at substantially the ends thereof. Said transverse wires 114 are welded to and contact both said wires 102 and 110. Uprights 116 are welded to said transverse wire 114 and the center section 106 of the transverse side of wire 102. Angle plates 118 are secured to the underside of wire 102 in the usual manner.

This particular type of truss frame is adapted to be used in an elongated cushion unit and the urethane mold therefor can be of any desired shape such as an elliptical or oval shape in cross section as indicated by dash line 122. The terminal ends of the foam 122 can extend substantially past the leg members 120 due to the added support of the extending lateral sides of wire 110. Self leveling legs 120 are secured in the respective angle brackets 118 and a strong, lightweight, beautifully styled cushion unit is provided.

Referring now to FIG. 24, a description of a method of making a cushion unit utilizing the truss frame will be described. A coating of vinyl particles, which could be precured polymerized particles, is brushed or sprayed onto the inner surfaces of preheated mold 150. An optional step of applying a releasing agent or barrier layer, such as any suitable silicon composition, could be sprayed on the inner surface of vinyl covering 152. This would prevent the vinyl surface or covering from binding to the urethane foam when said foam is formed. The truss frame 10, with supporting members 24 secured thereto, is positioned over the covering area in an inverted position. Next, a volume of polyurethane, foamable compound material is blown or poured into the mold, said compound being granules, liquid, pellets or flakes, depending on the type of foam compound to be used. If the foam composition material is of solid form, the heat generated by the mold 150 causes the foaming effect and the foam is created as the foam composition enters the mold. The foam composition is fed into the mold until the entire frame is encapsulated with the foam material, after which time the mold 150 is cooled and the assembly is removed in a structurally final form and structurally ready for use. If the foam composition material is in liquid form, the necessary reacting agents to cause the foaming reaction must be introduced so that foaming can take place.

It is to be understood that changes and modifications can be made to the disclosed frame and cushion structure without departing from the spirit of the invention, and consequently, the scope of the present invention should only be limited by the scope of the appended claims.

What is claimed is:

1. In a cushion unit, a cushion frame comprising a main supporting structure, said supporting structure comprising a truss, at least one supporting member mounted on said structure to support said structure a predetermined distance from a surface, cushion material encapsulating said structure, whereby said supporting structure provides great strength for a cushion unit, said main structure comprising receiving means mounted on said truss member, said receiving means adapted to rigidly secure at least one supporting member, said truss member comprising at least a pair of wires and said receiving means comprising at least one groove which engages at least one of said wires, whereby said receiving means is fitted to said truss member, said receiving means further comprising a button, said groove of said button contacting one of said wires, the other of said wires having an end welded to the top surface of said button, said button having a threaded hole therein for securing supporting members, and a retaining member being welded to said contacting wire and further contacts said groove of said button to secure said button in a contacting position with said contacting wire.

2. In a cushion unit, a cushion frame comprising a main supporting structure, said supporting structure comprising a truss, at least one supporting member mounted on said structure to support said structure a predetermined distance from a surface, cushion material encapsulating said structure, whereby said supporting structure provides great strength for a cushion unit, said truss member comprising at least a pair of wires, means mounted between said wires for retaining said wires in spaced relationship, each said wire forming a closed loop, said wires contacting each other and rigidly secured to each other at at least one location on said loop, said main support being substantially equilateral in configuration, said means for retaining said wires in spaced relationship comprising at least a third wire defining a closed loop and having an equilateral configuration with the same number of sides as that defined by said main support.

3. In a cushion unit, a cushion frame comprising a main supporting structure, said supporting structure comprising a truss, at least one supporting member mounted on said structure to support said structure a predetermined distance from a surface, cushion material encapsulating said structure, whereby said supporting structure provides great strength for a cushion unit, said truss member comprising at least a pair of wires, means mounted between said wires for retaining said wires in spaced relationship, each said wire forming a closed loop, said wires contacting each other and rigidly secured to each other at at least one location on said loop, and said means for retaining said wires in spaced relationship comprising cylindrically shaped buttons.

4. In a cushion unit, a cushion frame comprising a main supporting structure, said supporting structure comprising a truss, at least one supporting member mounted on said structure to support said structure a predetermined distance from a surface, cushion material encapsulating said structure, whereby said supporting structure provides great strength for a cushion unit, said truss member comprising at least a pair of wires, means mounted between said wires for retaining said wires in spaced relationship, each said wire forming a closed loop, said wires contacting each other and rigidly secured to each other at at least one location on said loop, one of said wires defining a closed loop and the other of said wires being disposed along one portion of said loop, and said other of said wires having two ends, each of which are secured to said one wire.

5. In a cushion unit, a cushion frame comprising a main supporting structure, said supporting structure comprising a truss, at least one supporting member mounted on said structure to support said structure a predetermined distance from a surface, cushion material encapsulating said structure, whereby said supporting structure provides great strength for a cushion unit, said truss comprising at least a pair of wires, means mounted between said wires for retaining said wires in spaced relationship, each said wire forming a closed loop, said wires contacting each other and rigidly secured to each other at at least one location on said loop, one of said wires defining a loop having a longitudinal and transverse axis, said one wire defining three planar sections when viewed along said longitudinal axis, the other wire defining a closed loop having a greater longitudinal dimension than the dimension of the first mentioned loop, and said means retaining said wires in spaced relationship comprising upright members.

6. A cushion frame as set forth in claim 2, wherein said configuration defined by said main support and said third wire are symmetrical with respect to the same center point and are disposed angularly with respect to each other.

7. A frame as set forth in claim 4, wherein said one of said wires has three sections lying in three intersecting planes.

8. A frame as set forth in claim 5, further comprising dimension of the first mentioned loop, and said means retaining said wires in spaced relationship comprising upright members.

References Cited by the Examiner
UNITED STATES PATENTS

| | | | |
|---|---|---|---|
| 2,838,100 | 6/1958 | Follows | 297—421 |
| 2,845,997 | 8/1958 | Waite | 297—457 |
| 2,950,505 | 8/1960 | Frank | 264—45 |
| 2,980,167 | 4/1961 | Harris et al. | 5—361 |
| 3,005,213 | 10/1961 | Brown et al. | 5—354 |
| 3,049,730 | 8/1962 | Wall et al. | 5—351 |
| 3,069,701 | 12/1962 | McInerney | 5—351 |
| 3,083,056 | 3/1963 | Ward | 297—452 |
| 3,084,980 | 4/1963 | Lawson | 297—455 |
| 3,112,987 | 12/1963 | Griffiths et al. | 264—45 |
| 3,142,515 | 7/1964 | Wall et al. | 297—452 |
| 3,143,375 | 8/1964 | Langbaum | 297—461 |

CASMIR A. NUNBERG, *Primary Examiner.*

FRANK B. SHERRY, *Examiner.*